(12) United States Patent
Schlierf et al.

(10) Patent No.: US 11,007,916 B2
(45) Date of Patent: May 18, 2021

(54) VEHICLE INTERIOR

(71) Applicant: GRAMMER AG, Amberg (DE)

(72) Inventors: Manfred Schlierf, Amberg (DE); Hubert Keller, Kuemmersbruck (DE)

(73) Assignee: GRAMMER AG, Ursensollen (DE)

( * ) Notice: Subject to any disclaimer, the term of this patent is extended or adjusted under 35 U.S.C. 154(b) by 39 days.

(21) Appl. No.: 16/327,152

(22) PCT Filed: Aug. 29, 2017

(86) PCT No.: PCT/DE2017/000275
§ 371 (c)(1),
(2) Date: Jun. 6, 2019

(87) PCT Pub. No.: WO2018/041289
PCT Pub. Date: Mar. 8, 2018

(65) Prior Publication Data
US 2019/0291617 A1    Sep. 26, 2019

(30) Foreign Application Priority Data

Aug. 31, 2016   (DE) .......................... 102016010469.4

(51) Int. Cl.
*B60R 19/34*      (2006.01)
*B60N 2/75*       (2018.01)
(Continued)

(52) U.S. Cl.
CPC ............. *B60N 2/773* (2018.02); *B60N 2/005* (2013.01); *B60N 2/01* (2013.01); *B60N 2/0248* (2013.01);
(Continued)

(58) Field of Classification Search
CPC ... B60R 7/04; B60R 2011/0007; B64D 11/06; B64D 11/0638; B60N 2/01; B60N 3/102;
(Continued)

(56) References Cited

U.S. PATENT DOCUMENTS 3,066,979 A * 12/1962 Pitts ..................... B60N 2/14
                                                    297/240
3,833,257 A    9/1974 Dove
(Continued)

FOREIGN PATENT DOCUMENTS

DE         10335046 A    2/2005
DE    102005043554 A    3/2007
(Continued)

*Primary Examiner* — Kiran B Patel
(74) *Attorney, Agent, or Firm* — Andrew Wilford

(57) ABSTRACT

The invention relates to a passenger compartment (20) of a vehicle (10) comprising at least one seat (14, 15, 16, 17) and comprising a console (18) that can be placed laterally adjacent the seat.
The particularity is that at least one seat (14, 15) is designed to be adjustable such that it can be moved out of a first position in which it faces in the travel direction, and into a second position, and that at least part of the console (18) is mounted so as to be movable out of a primary position in which it is laterally adjacent the seat, into a secondary position in which it is outside the movement path of the seat during movement of the seat between the first position and the second position.

6 Claims, 2 Drawing Sheets

(51) Int. Cl.
  *B60R 7/04*        (2006.01)
  *B60N 2/005*       (2006.01)
  *B60N 2/01*        (2006.01)
  *B60N 2/20*        (2006.01)
  *B60N 2/14*        (2006.01)
  *B60N 3/00*        (2006.01)
  *B60N 2/06*        (2006.01)
  *B60N 2/02*        (2006.01)
  *B60R 11/00*       (2006.01)

(52) U.S. Cl.
  CPC ............ *B60N 2/0292* (2013.01); *B60N 2/06* (2013.01); *B60N 2/14* (2013.01); *B60N 2/20* (2013.01); *B60N 2/757* (2018.02); *B60N 2/793* (2018.02); *B60N 2/797* (2018.02); *B60N 3/002* (2013.01); *B60R 7/04* (2013.01); *B60N 2002/022* (2013.01); *B60N 2002/0212* (2013.01); *B60N 2002/0272* (2013.01); *B60R 2011/0007* (2013.01); *B60R 2011/0084* (2013.01)

(58) Field of Classification Search
  CPC .. B60N 2/773; Y10S 224/926; Y10S 224/929
  See application file for complete search history.

(56) References Cited

U.S. PATENT DOCUMENTS

| | | | | |
|---|---|---|---|---|
| 5,951,084 A * | 9/1999 | Okazaki | ................... | B60N 2/06 296/37.16 |
| 6,027,170 A * | 2/2000 | Benz | ........................ | B60N 2/14 248/425 |
| 6,135,529 A * | 10/2000 | De Angelis | ............... | B60R 7/04 296/37.8 |
| 6,203,088 B1 * | 3/2001 | Fernandez | ................ | B60R 7/04 296/37.8 |
| 6,367,857 B2 * | 4/2002 | Kifer | ........................ | B60R 7/04 296/24.34 |
| 6,752,444 B2 * | 6/2004 | Kitano | ..................... | B60R 7/04 296/184.1 |
| 7,015,799 B1 * | 3/2006 | Kitano | ..................... | B60R 7/04 180/89.11 |
| 7,441,822 B1 * | 10/2008 | Day | ................... | B60N 2/01541 296/65.01 |
| 7,591,498 B2 * | 9/2009 | Busha | ..................... | B60N 3/101 296/24.34 |
| 8,087,729 B2 | 1/2012 | Kladde | | |
| 8,919,847 B2 * | 12/2014 | Mather | .................. | B60N 2/753 296/24.34 |
| 9,597,893 B2 | 3/2017 | Strasdat | | |
| 9,776,572 B2 * | 10/2017 | Mizobata | ............... | B60H 1/246 |
| 10,155,548 B2 * | 12/2018 | Baccouche | ............. | B60N 2/06 |
| 10,703,224 B2 * | 7/2020 | Vanel | ....................... | B60N 2/14 |
| 10,717,358 B2 * | 7/2020 | Patil | ....................... | B60K 35/00 |
| 2003/0197392 A1 * | 10/2003 | Clark | ........................ | B60R 7/04 296/24.34 |
| 2003/0234550 A1 | 12/2003 | Brooks | | |
| 2004/0139757 A1 * | 7/2004 | Kuehl | .................. | B60N 2/5628 62/237 |
| 2007/0158979 A1 * | 7/2007 | Saberan | .................... | B60N 2/06 297/47 |
| 2009/0058120 A1 * | 3/2009 | Ioka | ......................... | B60N 2/79 296/24.34 |
| 2009/0058152 A1 * | 3/2009 | Orlo | ....................... | B60N 2/206 297/163 |
| 2009/0072572 A1 * | 3/2009 | Scheinberg | ............. | B60N 2/06 296/64 |
| 2013/0187400 A1 * | 7/2013 | Alessandro | ............... | B60R 7/04 296/24.34 |
| 2016/0272120 A1 * | 9/2016 | Johnston | ................... | B60R 7/04 |
| 2017/0217351 A1 * | 8/2017 | Jaradi | .................... | B60N 3/063 |
| 2018/0272900 A1 * | 9/2018 | Fitzpatrick | ............... | B60N 2/01 |
| 2018/0312082 A1 * | 11/2018 | Lalague | ................... | B60N 2/91 |
| 2018/0312127 A1 * | 11/2018 | Lalague | ................... | B60N 2/91 |
| 2020/0055423 A1 * | 2/2020 | Prozzi | .................... | B60N 2/015 |
| 2020/0189423 A1 * | 6/2020 | Dry | ........................ | B60N 2/0725 |
| 2020/0189498 A1 * | 6/2020 | Line | ....................... | B60R 16/027 |

FOREIGN PATENT DOCUMENTS

| | | |
|---|---|---|
| DE | 102006011994 A | 2/2008 |
| JP | 2015209193 A | 11/2015 |

* cited by examiner

VEHICLE INTERIOR

FIELD OF THE INVENTION

The invention relates to a passenger compartment of a land vehicle, air vehicle or watercraft.

BACKGROUND OF THE INVENTION

A vehicle of this kind is known from public prior use. A passenger car comprises a vehicle passenger compartment, in which two seats are arranged in the front region of the vehicle and two seats are arranged in the back region of the vehicle. A console is fixedly arranged between the seats in the front region, which console comprises an armrest and a container comprising storage pockets, a control panel and a USB connection.

OBJECT OF THE INVENTION

The object of the invention is to make the vehicle passenger compartment such that the components contained therein can be arranged in a more flexible manner. This may be desirable for example when the vehicle is transferred from a manual control mode into an automatic control mode, or vice versa. It is intended to be possible, for example, to move at least the seat of the vehicle driver, and optionally the seat located laterally adjacent the vehicle driver in the front region from a position in which this seat faces in the forward travel direction, into a position in which the seat is directed in a different position in which it for example faces the seats of the back region or for example faces a table.

SUMMARY OF THE INVENTION

The vehicle passenger compartment according to the invention comprises at least one seat. The vehicle passenger compartment may comprise for example two seats in the front region and for example two or more seats in the back region. A console is laterally adjacent the seat, in order to allow the seat occupant to access the console.

The seat is designed to be adjustable by an adjuster so as to be movable from a first position in which it faces in the travel direction into a second position. Within the meaning of the invention, "facing in the travel direction" means that an occupant located in the seat is facing in the forward travel direction. In the second position, the seat may be oriented for example such that the occupant is facing the seats of the back of the vehicle for example, or such that the occupant is facing a table that is for example located in the vehicle. During movement between the first and the second position, the seat performs for example moves in a straight line, rotates, or executes a hybrid movement having straight-line and rotational components.

At least part of the console is mounted so as to be movable by the adjuster such that it can be moved out of a primary position in which it is laterally adjacent the seat into a secondary position in which it is outside the movement path of the seat during movement of the seat between the first position and the second position. This means that the entire console or a part of the console can be moved out of the primary position and into the secondary position. During movement between the primary and the secondary position, the part of the console performs for example straight-line movement, rotation, or a mixed movement having straight-line and rotational components. In the secondary position, the part is for example between two seats of the back region or within reach of a bench seat of the back region.

It is thus possible to move the part of the console from the primary position out of the movement path of the seat and into the secondary position, and subsequently to move the seat for example the seat of the vehicle driver and a further front seat into the second position. The part of the console can then either remain in the secondary position or be moved back into the primary position again, in order to also allow the occupant of the seat to access the console after the seat has been moved into the second position.

In this way, the seat of the vehicle driver and optionally also the seat laterally adjacent the driver in the front region can be oriented, in the case of automatic control of the vehicle such that the vehicle driver can for example more easily converse with the remaining vehicle occupants or for example perform tasks at a table.

The adjuster comprises for example a guide for the seat and/or for the part of the console. The console and the seat can be guided by the guide in the event of rotation, straight-line movement, or a mixed movement having straight-line and rotational components.

The adjuster comprises for example a drive for the seat and/or for the part of the console. This may be an electrical drive for example. The drive may be provided for example for the straight-line movement, the rotational movement or the mixed movement having straight-line or rotational components of the entire seat. Furthermore, the drive may for example move parts of the seat such as the armrest or the backrest. According to an alternative, the seat and/or the part of the console may also be moved manually.

For example a controller is provided that controls the course of the movement of the part of the console and the movement of the seat in the event of a signal for adjusting the seat by controlling the drive for the part of the console and the drive for the seat. The controller controls the drive for example such that first the console is moved out of the primary position and into the secondary position, and subsequently the driver seat and the passenger seat are brought into a compact position, in that the armrest is lowered into a nonuse position in a recess of the backrest and the backrest is brought into an upright position. The controller then first causes the driver seat to be moved out of the first position and into the second position, and then the passenger seat to be moved out of the first position and into the second position, and finally the console to be moved back into the primary position again.

The seat comprises for example at least one armrest that can be moved between a usage and a nonuse position, wherein for example the armrest is integrated into a recess of a backrest of the vehicle seat in the nonuse position. In the event of a position change of the seat, in the nonuse position the armrest is not located in the movement path of other components of the passenger compartment of the vehicle.

According to an embodiment, the console, in particular a frame of the console, forms an armrest region.

The seat and/or the console comprise for example at least one air-conditioning component and/or an operating component for a controller and/or a network port and/or a compartment such as a cooling compartment or a storage pocket.

The part of the console is for example between two seats of the front region in the primary position and within reach of an occupant of a seat or a bench seat of the back region in the secondary position.

The central console comprises for example a frame and a container, the container being mounted so as to be movable relative to the frame. It is possible for example for the frame to be fixed in the vehicle passenger compartment and for the container to be mounted so as to be movable. According to an alternative, the frame and the container are mounted so as to be movable and can be separated from one another.

The frame and the container can for example be moved into a nested position in which the container is received in a tunnel of the frame. The container can be moved for example from the nested position into a separated position in which the container is separated from the frame.

BRIEF DESCRIPTION OF THE DRAWING

Further advantages of the invention can be found in the description of an exemplary embodiment that is shown in the schematic figures. In the figures.

SPECIFIC DESCRIPTION OF THE INVENTION

Figure 1:
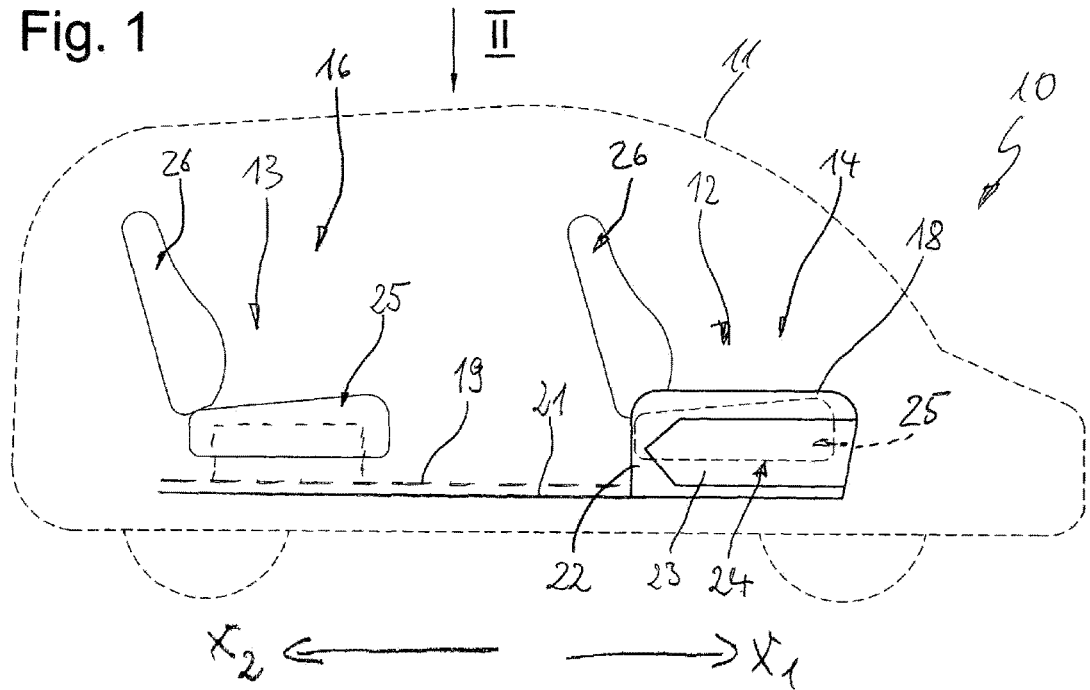
FIG. 1 is a side view of a vehicle comprising a front region and comprising a back region.

A vehicle as a whole is shown in the figures by reference character 10. The same reference characters in the different figures refer to the same parts, even if small letters follow or are omitted.

FIG. 1 is a side view of the vehicle 10. A body 11 of the vehicle 10 is indicated by a dashed line. The forward travel direction is denoted by $x_1$. The vehicle 10 has a passenger compartment 20 comprising a front region 12 and a back region 13.

Figure 2:
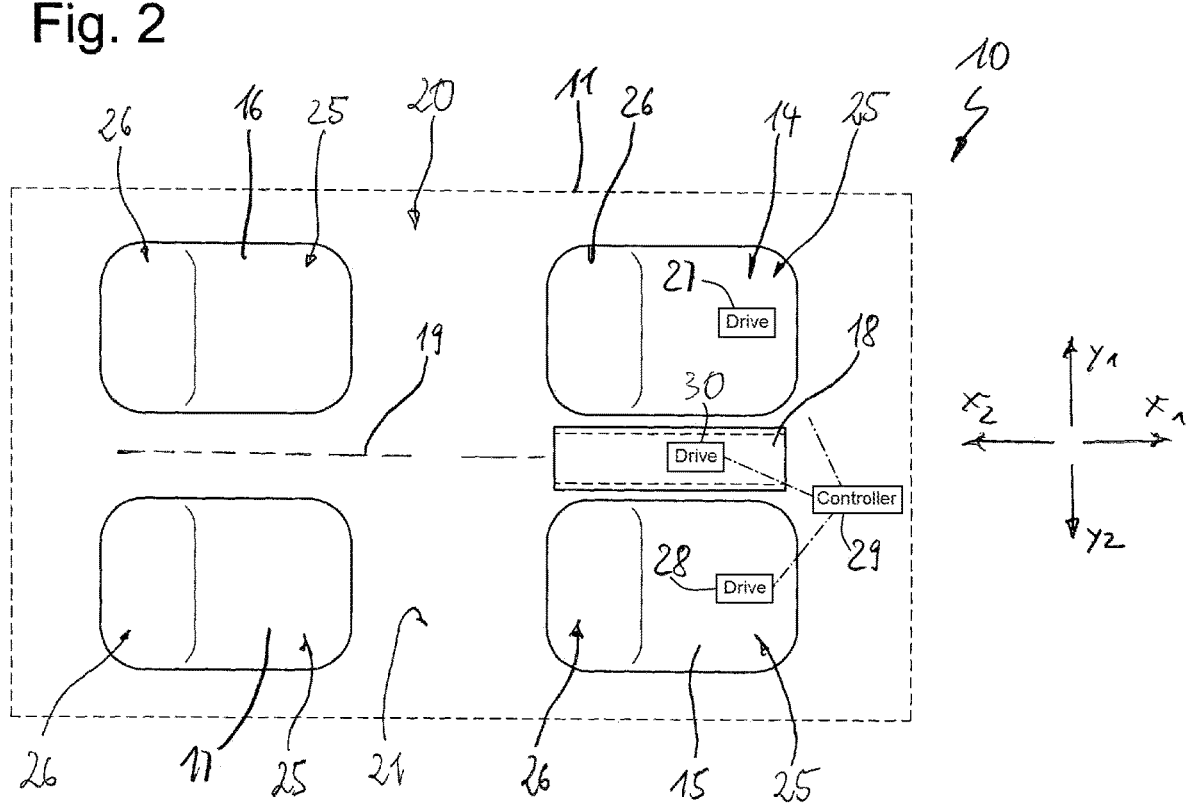
FIG. 2 is a view according to arrow II in FIG. 1, seats of the front region being located in a first forward-facing position and a console being in a primary front position.

According to FIG. 2, the front region 12 holds two seats 14 and 15. The back region 13 holds two seats 16 and 17. According to FIG. 2, the seats 14, 15, 16 and 17 face in the forward direction $x_1$, i.e. a seat occupant is facing in the forward travel direction $x_1$. Each seat comprises a seat part 25 and a backrest part 26. A gap a is formed between the seats 14, 15 of the front region 12 to allow for a console 18 to be in the intermediate space.

Figure 3:
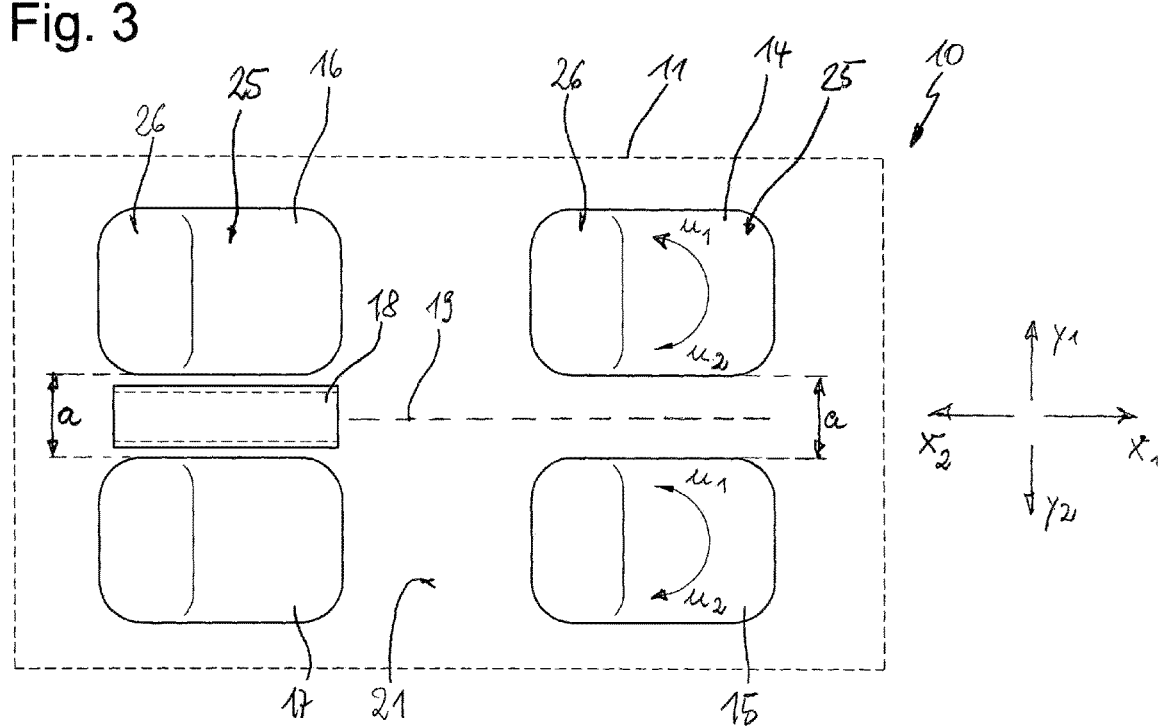
FIG. 3 is a plan view of the vehicle like FIG. 2 where the seats of the front region are in the primary forward-facing positions and the console is in a secondary rear position.
Figure 4:
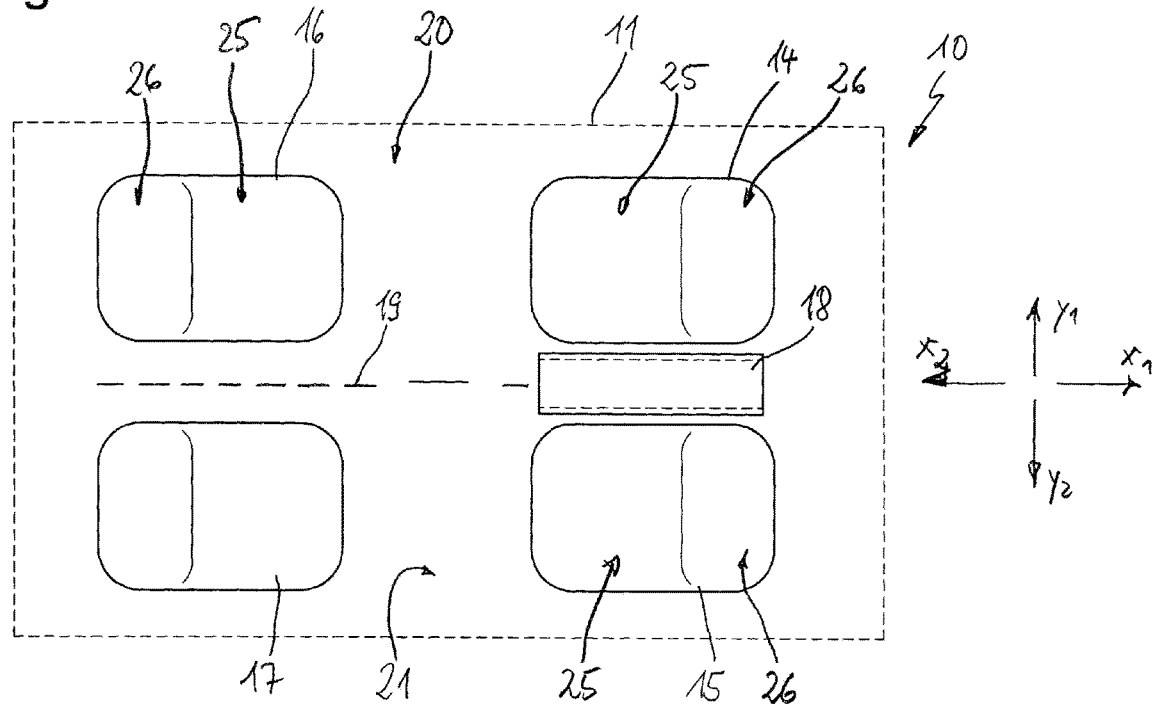
FIG. 4 is a plan view of the vehicle like FIG. 2 where the seats of the front region are in a second rearward-facing position and the console is in the primary front position.

The seats 14 and 15 can be pivoted out of the first front-facing positions shown in FIGS. 2 and 3, and into the second rearward-facing positions shown in FIG. 4 and vice versa. In the second position, the seats 14 and 15 are for example pivoted by 180°. That is to say that they face in the rearward direction $x_2$. However, according to an alternative, it is also possible for example for the seats 14 and 15 to be pivotable about any other desired angle. The seats could in addition be movable in a straight line, for example in the directions $x_1$ or $x_2$, and/or in the directions $y_1$ or $y_2$. It can be seen according to FIG. 2 that the console 18 is located in the movement path of the seats 14 and 15.

The console 18 is mounted so as to be movable between a primary position shown in FIG. 2, and a secondary position that can be seen in FIG. 3. In the secondary position, the console 18 is between the seats 16 and 17. In order to move the console 18, a guide 19 is provided that is fastened to a floor 21 of the passenger compartment 20. The guide 19 allows for straight-line movement of the console 18 out of the primary front position, in the direction $x_2$ and into the secondary rear position. From the secondary rear position, the console 18 can be moved in the direction $x_1$ into the primary front position.

The seats 14 and 15 and the console 18 can be pivoted by respective drives 27 and 28 comprising electric motors. These drives 27 and 28 are controlled by a controller 29. A vehicle occupant transmits, for example via a control panel on the console 18, the signal to the controller 29 that autopilot should be switched on and the seat 14 or 15 should be moved out of the first forward-facing position and into the second rearward-facing position.

The controller 29 then controls a drive 30 of the console 18 such that the console 18 is moved into the secondary rear position according to FIG. 3. If the console 18 is in the secondary rear position, the controller 29 controls the drive 28 for example such that first the seat 15 is pivoted in the direction $u_1$ into the second rearward-facing position, and subsequently the seat 14 is pivoted by the respective drive 27 into the rearward second position. Prior to pivoting the seats 14 and 15, they can for example be brought into a compact position in that a backrest part 26 is brought into a vertical position and an armrest is lowered into a stowage position in a recess of the backrest part 26. Thereafter, the drive 30 is controlled by the controller 29 such that the console is moved back into the primary position (see FIG. 4).

If the vehicle is to be manually driven again, an occupant can again send a signal to the controller 29 via the control panel, which signal triggers a reverse algorithm. That is to say that the controller 29 makes the console 18 move out of the primary front position and into the secondary rear position. Subsequently, the seat 15 is pivoted in the direction $u_2$ by the respective drive 28, and then the seat 14 is pivoted in the direction $u_1$ out of the second rearward facing position and into the first front-facing position by the respective drive 27. Before this movement of the seats 14 and 15 also, they can be brought into the compact position again. Thereafter, the console 18 is moved back into the primary position by the respective drive 30.

According to FIG. 1, the console 18 is C-shaped. It comprises a frame 22 and a container 23. The frame 22 forms a tunnel 24 in which the container 23 can be arranged in a nested position. The frame 22 comprises an opening (not shown) through which the container 23 can be moved out of the nested position shown in FIG. 1 in the direction $x_2$ and into a separated position in which the container is between the seats 16 and 17. During movement, the container 23 is guided by the guide 19 and driven by the drive. In other words, if the seat position of the seats 14 and 15 is not intended to be changed, the container 23 can be moved separately into the separated position while the frame 22 remains in the primary position. The occupants of the seats 16 and 17 then also may access the container.

It may be possible for the entire console 18 or the container 23 alone to be able to be locked by a latch in defined positions or in each set position.

The invention claimed is:

1. A passenger compartment of a vehicle comprising:
a seat;
a console;
a seat drive for moving the seat out of a first front-facing position in which the seat faces in the travel direction and into a second position facing in another direction;
a console drive connected to the console for moving a part of the console out of a primary position in which it is laterally adjacent the seat and in a movement path of the seat on movement between the respective positions into a secondary position in which it is outside the movement path of the seat during movement of the seat by the seat drive between the first forward-facing position and the second position; and a controller connected to the drives for, prior to movement of the seat by the seat drive from the first front-facing position into the second position, moving the console from the primary position into the secondary position.

2. The passenger compartment of a vehicle according to claim 1, further comprising:

a guide on which the console travels on movement between the respective positions.

3. The passenger compartment of a vehicle according to claim 1, wherein the seat pivots when moving between the respective positions.

4. The passenger compartment of a vehicle according to claim 1, wherein the console moves in a straight line between the respective positions.

5. The passenger compartment of a vehicle according to claim 1, wherein adjacent the seat there is another seat in a front region of the compartment and there are two of the seats in a back region of the compartment, the part of the console being between the seats of the front region in the primary position and is within reach of the seats of a back region in the secondary position.

6. The passenger compartment of a vehicle according to claim 1, wherein the console comprises a frame and a container, and the container is mounted so as to be movable relative to the frame.

\* \* \* \* \*